United States Patent [19]

Kuwana et al.

[11] Patent Number: 5,220,506

[45] Date of Patent: * Jun. 15, 1993

[54] ANTI-SKID CONTROL SYSTEM FOR AN AUTOMOTIVE VEHICLE THAT INCLUDES AN ARRANGEMENT FOR VARYING THE BRAKING PRESSURE AND THE BRAKING PRESSURE HOLD TIME

[75] Inventors: Kazutaka Kuwana, Toyota; Tsuyoshi Yoshida, Obu; Hiroyuki Ichikawa, Okazaki; Kenji Tozu, Kariya, all of Japan

[73] Assignee: Aisin Seiki Kabushiki Kaisha, Kariya, Japan

[ * ] Notice: The portion of the term of this patent subsequent to May 26, 2009 has been disclaimed.

[21] Appl. No.: 612,998

[22] Filed: Nov. 15, 1990

[30] Foreign Application Priority Data

Nov. 16, 1989 [JP] Japan ................................... 1-298491

[51] Int. Cl.$^5$ ............................................... B60T 8/32
[52] U.S. Cl. ................................ 364/426.02; 303/97; 303/106; 303/109; 303/110
[58] Field of Search ...................... 364/426.01, 426.02, 364/426.03; 303/91, 95, 97, 99, 100, 102, 103, 105, 106, 109, 110; 180/197

[56] References Cited

U.S. PATENT DOCUMENTS

| 3,637,264 | 1/1972 | Leiber et al. | 303/105 |
| 3,727,992 | 4/1973 | Bowler et al. | 303/105 |
| 4,191,430 | 3/1980 | Schirmer | 303/109 |
| 4,701,855 | 10/1987 | Fennel | 303/105 X |
| 4,774,667 | 9/1988 | Kuraoka et al. | 364/426.02 |
| 4,859,002 | 8/1989 | Yoshino | 303/103 |
| 5,016,178 | 5/1991 | Kuwana et al. | 364/426.02 |
| 5,116,109 | 5/1992 | Kuwana et al. | 303/109 |

FOREIGN PATENT DOCUMENTS

| 1914765 | 10/1970 | Fed. Rep. of Germany . |
| 3828241 | 5/1989 | Fed. Rep. of Germany . |
| 64-52568 | 2/1989 | Japan . |

*Primary Examiner*—Parshotam S. Lall
*Assistant Examiner*—Collin W. Park
*Attorney, Agent, or Firm*—Burns, Doane, Swecker & Mathis

[57] ABSTRACT

The invention is directed to an anti-skid control system for controlling a braking force applied to a road wheel with a hydraulic braking pressure supplied to a wheel brake cylinder through pressure control means. On the basis of a wheel speed of the road wheel detected by detecting means, a wheel acceleration and an estimated vehicle speed are calculated. A difference between the wheel speed and the estimated vehicle speed is calculated, and an integrated value thereof during a certain period is obtained. Then, a wheel lock rate indicative of a locking condition of the road wheel is set on the basis of the integrated value at least. Means is provided for setting an increasing time for increasing the hydraulic braking pressure and a holding time for holding it as it is with a proportion therebetween determined in response to a relationship between the wheel acceleration and the wheel lock rate, or setting a decreasing time and the holding time as well. The pressure control means is arranged to alternately increase and hold the hydraulic braking pressure in response to the increasing time and holding time, or decrease and hold it as well.

6 Claims, 14 Drawing Sheets

ANTI-SKID CONTROL SYSTEM FOR AN AUTOMOTIVE VEHICLE THAT INCLUDES AN ARRANGEMENT FOR VARYING THE BRAKING PRESSURE AND THE BRAKING PRESSURE HOLD TIME

BACKGROUND OF THE INVENTION

1. Field of the Invention

The present invention relates to an anti-skid control system for use in an automotive vehicle, and more particularly to an anti-skid control system for controlling braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation In order to prevent the road wheels from being locked, therefore, there has been employed an anti-skid control system which controls the braking force by decreasing or increasing a hydraulic braking pressure supplied to a wheel brake cylinder. In view of the fact that when the hydraulic braking pressure supplied to the wheel brake cylinder is increased, the rotational speed of the road wheel is rapidly reduced immediately before a coefficient of friction of a road surface relative to the road wheel reaches a maximum, the anti-skid control system controls the hydraulic braking pressure in response to the variation of wheel speed and that of wheel acceleration in order that a slip rate of the road wheel results in around 10% to 20%, that is, the maximum coefficient of friction is obtained.

According to the anti-skid control system as described above, in general, a rotational speed of each of the road wheels or a wheel speed is detected, and an estimated vehicle speed is calculated on the basis of the wheel speed to provide a threshold value which is compared with the wheel speed of each road wheel, and then the hydraulic braking pressure in a wheel brake cylinder mounted on each of the road wheels is controlled in response to the result of comparison. And, Japanese Patent Laid-open Publication No. 64-52568, it has been proposed to improve such anti-skid braking system that provides a "decrease" zone, or a zone for decreasing the hydraulic braking pressure in the wheel brake cylinder, and an "increase" zone, or a zone for increasing the hydraulic braking pressure, in response to the slip rate and the wheel acceleration, and that can vary the extent of each zone. In the above publication, there is disclosed a system which enables the memory to reduce its capacity to be needed.

However, in the above-described prior system which simply provided the decrease zone and increase zone separately, the condition for controlling the braking force is likely to vary due to the difference in decrease-increase characteristic of pressure control means for controlling the hydraulic braking pressure of every vehicle, the difference in size of the tire, the difference in characteristic of the vehicle braking system as a whole, or the difference in coefficient of friction of the road surface. Although the above-described prior system may provide a pulse decrease control which alternately performs a "decrease" operation for decreasing the hydraulic braking pressure and a "hold" operation for holding the hydraulic braking pressure as it is in the decrease zone, it will be difficult to adequately control the hydraulic braking pressure when the proportion of the decreasing time and the holding time has been fixed in advance.

SUMMARY OF THE INVENTION

Accordingly, it is an object of the present invention to provide an anti-skid control system for an automotive vehicle which performs an adequate control of hydraulic braking pressure in a wheel brake cylinder without being affected by the difference in various characteristics of every vehicle to improve the controllability and stability of the vehicle.

In accomplishing the above and other objects, an anti-skid control system for an automotive vehicle which has a wheel brake cylinder mounted on each road wheel for applying a braking force thereto and a master cylinder for supplying a hydraulic braking pressure to the wheel brake cylinder. The anti-skid control system is provided with means for detecting a wheel speed of the road wheel and providing output signal corresponding to the wheel speed, means for receiving the output signal and calculating a wheel acceleration from the wheel speed, means for receiving the output signal and setting an estimated vehicle speed calculated on the basis of the wheel speed, means for calculating a difference between the wheel speed and the estimated vehicle speed, and means for setting a wheel lock rate indicative of a locking condition of the road wheel on the basis of at least an integrated value of the difference between the wheel speed and the estimated vehicle speed obtained during a predetermined period of time. And, means is provided for setting an increasing time for increasing the hydraulic braking pressure applied to the wheel brake cylinder and a holding time for holding the hydraulic braking pressure as it is with a proportion between the increasing time and the holding time determined in response to a relationship between the wheel acceleration and the wheel lock rate, and setting a decreasing time for decreasing the hydraulic braking pressure and the holding time with a proportion between the decreasing time and the holding time determined in response to a relationship between the wheel acceleration and the wheel lock rate. Further, pressure control means is provided for alternately increasing and holding the hydraulic braking pressure in response to the increasing time and the holding time, or alternately decreasing and holding the hydraulic braking pressure in response to the decreasing time and the holding time.

The above-described anti-skid control system may further comprises means for calculating a slip rate on the basis of the wheel speed and the estimated vehicle speed, and wherein means for setting the wheel lock rate may be arranged to set the wheel lock rate on the basis of the integrated value and a value which is added thereto and calculated from at least one of the slip rate and the difference between the wheel speed and the estimated vehicle speed.

In the above-described anti-skid control system, means for setting the wheel lock rate is preferably arranged to set the wheel lock rate by adding the slip rate with a certain weight given thereto to the difference with another certain weight given thereto, and adding the total value thereof to the integrated value.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
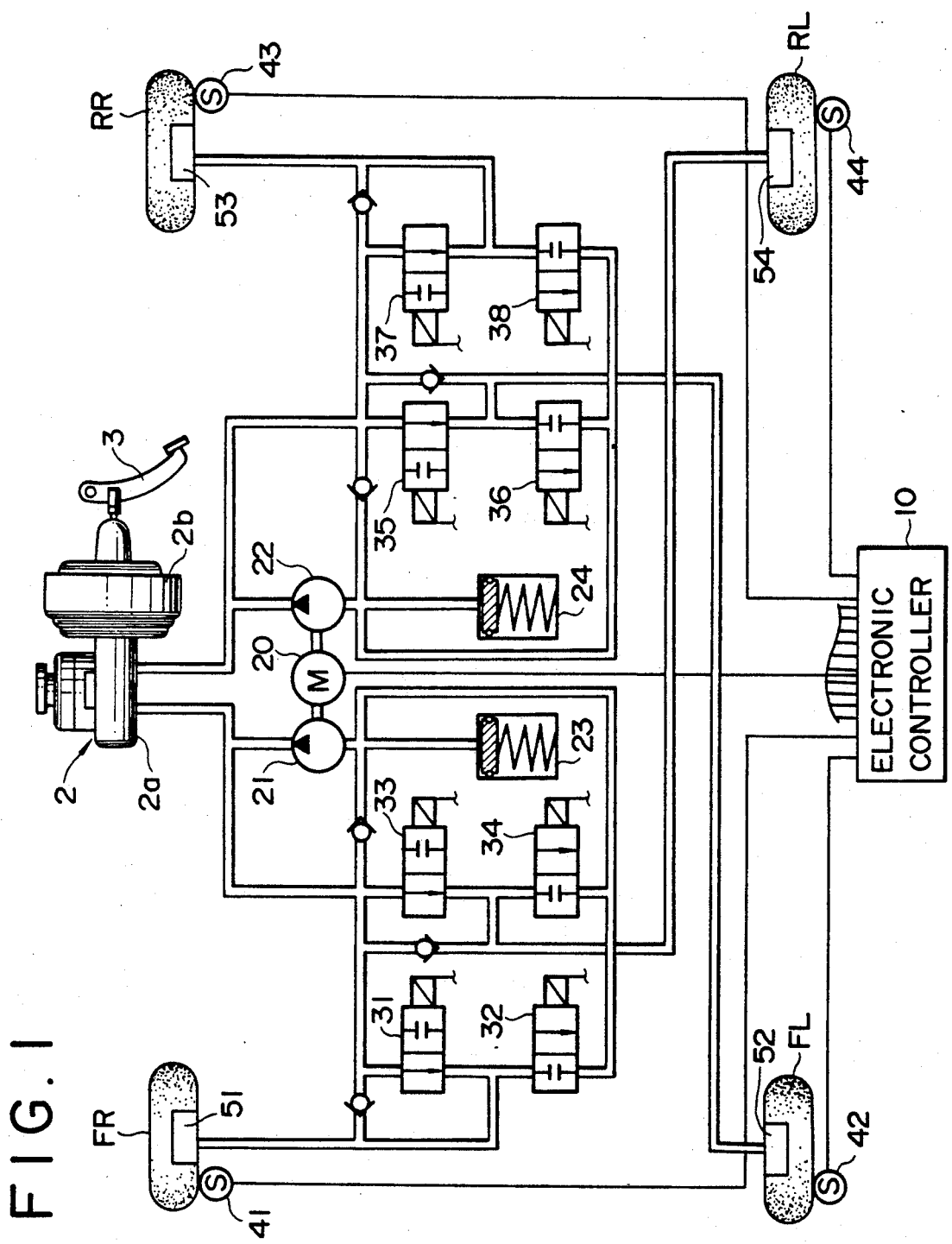
FIG. 1 is a schematic block diagram of an anti-skid control system of an embodiment according to the present invention.

Referring to FIG. 1, there is schematically illustrated an embodiment of the present invention, wherein pumps 21, 22, reservoir 23, 24 and solenoid valves 31 to 38 are disposed in hydraulic circuits for connecting a hydraulic pressure generator 2 which includes a master cylinder 2a and a booster 2b operated in response to depression of a brake pedal 3, to wheel brake cylinders 51 to 54 of road wheels FR, FL, RR and RL. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side, and a so-called diagonal circuit is employed as is apparent from FIG. 1.

The solenoid valves 31, 32 and solenoid valves 33, 34 are disposed respectively in hydraulic circuits for connecting one output port of the master cylinder 2a to the wheel brake cylinders 51, 54, and the pump 21 is disposed between the master cylinder 2a and the solenoid valves 31 to 34. Similarly, the solenoid valves 35, 36 and solenoid valves 37, 38 are disposed respectively in hydraulic circuits for connecting the other output port of the master cylinder 2a to the wheel brake cylinders 52, 53, and the pump 22 is disposed between the master cylinder 2a and the solenoid valves 35 to 38. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the normally open solenoid valves 31, 33, 35, 37. The hydraulic circuits at the drain side of the normally closed solenoid valves 32, 34 are connected to the pump 21 through the reservoir 23, and the hydraulic circuits at the drain side of the solenoid valves 36, 38 are connected to the pump 22 through the reservoir 24. Each of the reservoirs 23, 24 is provided with a piston and a spring, and functions so as to store the brake fluid returned from each of the solenoid valves 32, 34, 36, 38 through the hydraulic circuits at the drain side thereof, and to supply the brake fluid to each of those solenoid valves when the pumps 21, 22 operate.

Each of the solenoid valves 31 to 38 is a two ports-two positions solenoid operated changeover valve, and is in its first operating position as shown in FIG. 1 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 1 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 38 turned on or off, the hydraulic braking pressure in each of the wheel brake cylinders 51 to 54 (hereinafter referred to as wheel cylinder pressure) is decreased or increased. Namely, when the current is not fed to the solenoid coil of each of the solenoid valves 31 to 38, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. As the solenoid valves 31 to 38, there may be employed three ports-two positions solenoid operated valves of a half number of the valves 31 to 38.

The above-described solenoid valves 31 to 38 are connected to the electronic controller 10 which controls the operation of the solenoid valves 31 to 38. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor.

Figure 2:
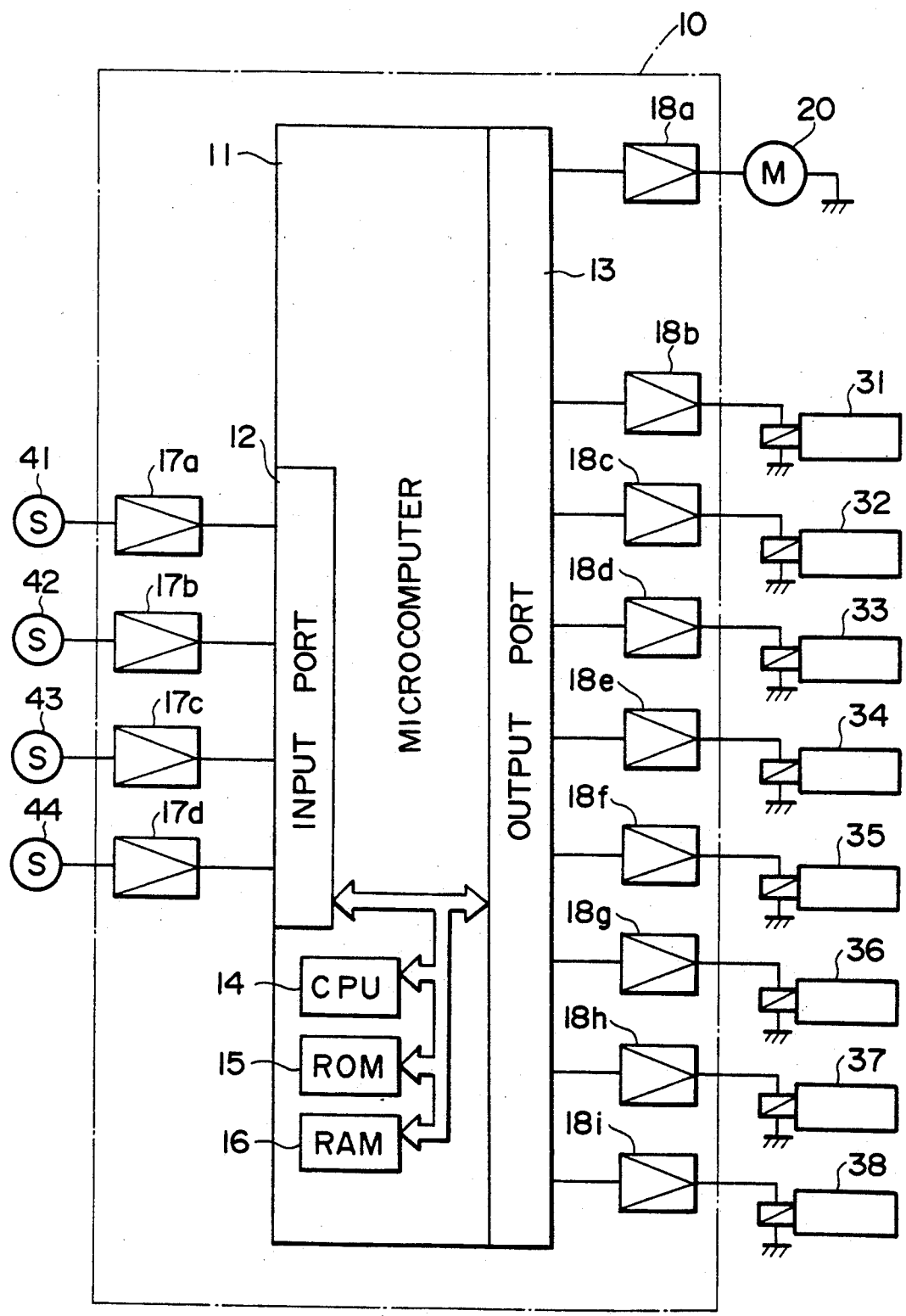
FIG. 2 is a block diagram illustrating the arrangement of an electronic controller as shown in FIG. 1.

As shown in FIG. 2, the electronic controller 10 is provided with a one-chip microcomputer 11, which includes a central processing unit or CPU 14, a read-only memory or ROM 15 and a random access memory or RAM 16, which are connected with an input port 12 and an output port 13 via a common bus to execute the input/output operations relative to external circuits. The signal detected by each of the wheel speed sensors 41 to 44 is fed to the input port 12 via respective amplification circuits 17a to 17d and then to the CPU 14. Then, a control signal is output from the output port 13 to the electric motor 20 via a drive circuit 18a, and control signals are output to the solenoid valves 31 to 38 via the respective drive circuits 18b to 18i.

A program routine executed by the electronic controller 10 for the anti-skid control will now be described with reference to FIGS. 3-7 which are flowcharts showing an operation executed in accordance with a program of one embodiment of the present invention, which program is executed repeatedly at intervals of a predetermined period of time.

The program routine provides for initialization of the system at Step 201 where various counters, timers or the like are cleared. As for internal registers of the microcomputer 11, there are provided mode registers and flag registers. The mode registers are arranged to provide various modes such as a decrease mode, an increase mode and a hold mode which decreases, increases and holds the wheel cylinder pressure respectively. In addition, the mode registers provide a pulse increase mode, a pulse decrease mode and a rapid decrease mode. The pulse decrease mode performs a "decrease pressure" operation for decreasing the wheel cylinder pressure during a first predetermined period of time properly set as described later, and performs a "hold pressure" operation for holding the wheel cylinder pressure as it is during a second predetermined period of time following the decrease pressure operation to repeatedly perform the "decrease pressure" and "hold pressure", i.e., to perform a "pulse decrease pressure". The pulse increase mode is a mode to repeatedly perform a "increase pressure" operation for increasing the wheel cylinder pressure and the "hold pressure" operation, i.e., to perform a "pulse increase pressure". The rapid decrease mode is a mode to perform only the "decrease pressure" operation, but decrease the wheel cylinder pressure rapidly comparing with the operation in the pulse decrease mode. As to the flags, there are provided at least a rapid decrease flag which is set (to "1") to provide the rapid decrease mode, and a pulse increase flag which is set to provide the pulse increase mode.

As to the counters, there is provided at least a pulse increase counter which counts the number of the "pulse increase pressure" performed. As to the timers, there are provided a system timer, as well as a decrease timer, an increase timer and a hold timer which output a decrease mode signal, an increase mode signal and a hold mode signal for a predetermined period of a decreasing time, an increasing time and a holding time respectively.

Figure 3:
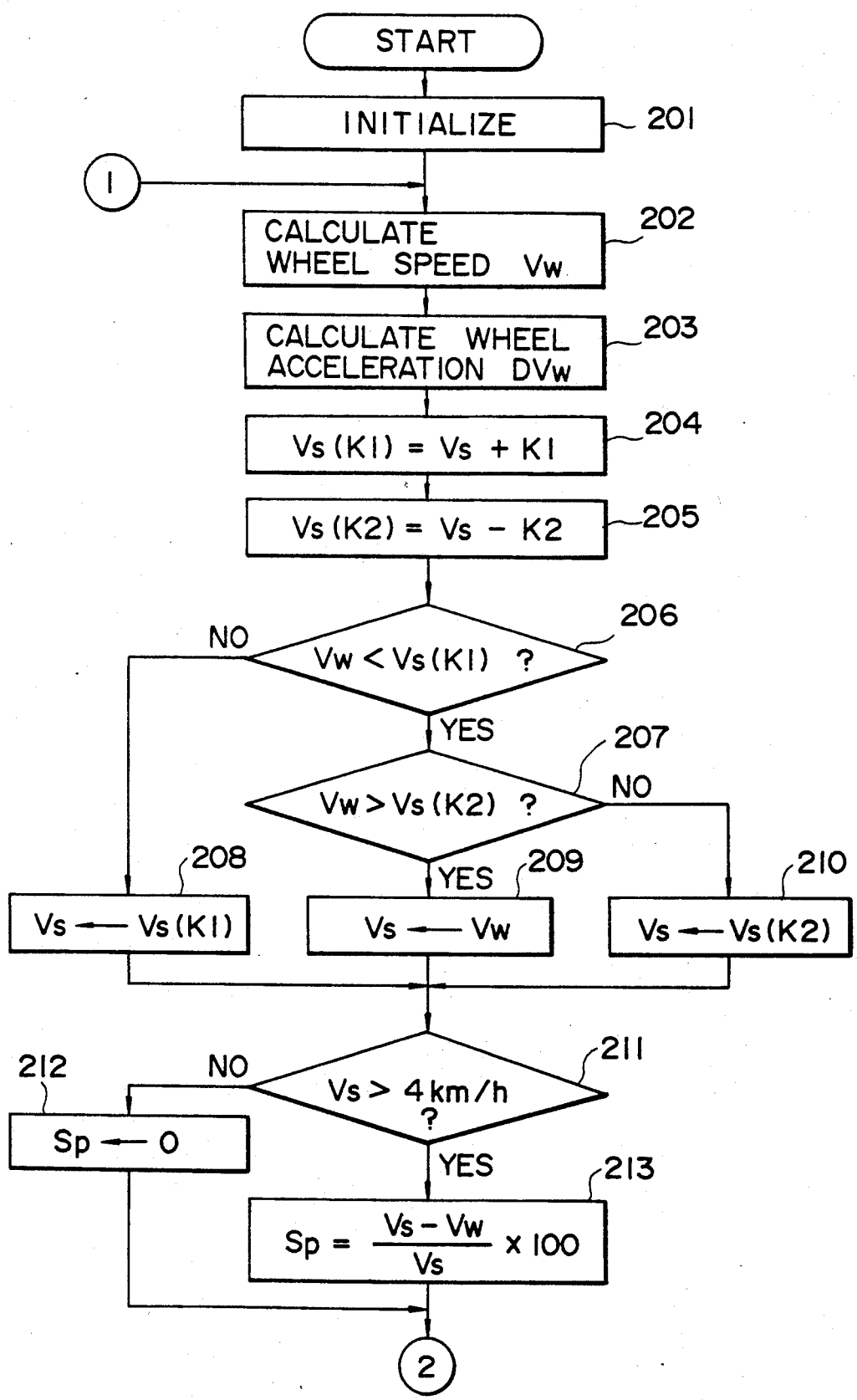
FIGS. 3, 4, 5, 6 and 7 are flowcharts showing the operation of the braking force control according to an embodiment of the present invention.

Then, the program proceeds to Step 202 in FIG. 3, where the wheel speed of each of the road wheels is calculated in known fashion on the basis of the output signal from each of the wheel speed sensors 41 to 44. Hereinafter will be used a vehicle speed Vw of one of the road wheels representing others for simplicity. Next, the wheel acceleration DVw is calculated from the wheel speed Vw at Step 203. The wheel acceleration DVw includes the wheel deceleration which is indicated by a negative value, while the acceleration is indicated by a positive value. The program proceeds further to Steps 204, 205, where a first set speed Vs(K1) and a second set speed Vs(K2) are obtained by adding a certain value K1 to the estimated vehicle speed Vs calculated at the preceding cycle of the routine, and subtracting a certain value K2 therefrom respectively. The certain value K1 corresponds to a speed having 4.0 G (G is the acceleration of gravity) which is the highest value of a vehicle acceleration AVv, whereas the certain value K2 corresponds to a speed having $-1.2$ G which is the lowest value of a vehicle deceleration DVv.

Then, the program proceeds to Step 206 where the wheel speed Vw is compared with the first set speed Vs(K1). If it is determined that the wheel speed Vw is not less than the first set speed Vs(K1), the program proceeds to Step 208 where the estimated vehicle speed Vs is set to the first set speed Vs(K1). If the wheel speed Vw is less than the first set speed Vs(K1), the program proceeds to Step 207 where the wheel speed Vw is compared with the second set speed Vs(K2). If it is determined that the wheel speed Vw is greater than the second set speed Vs(K2), the program proceeds to Step 209 where the estimated vehicle speed Vs is set to the wheel speed Vw. If the wheel speed Vw is not greater than the second set speed Vs(K2), the program proceeds to Step 210 where the estimated vehicle speed Vs is set to the second set speed Vs(K2). In the case where a wheel speed sensor is mounted on each of the road wheels, the estimated vehicle speed Vs is calculated on the basis of the maximum wheel speed in known fashion.

Thereafter, the program proceeds to Step 211 where it determines if the estimated vehicle speed Vs is greater than the minimum speed (4 km/h) for initiating the anti-skid control. If it is not greater than the minimum speed, the program proceeds to Step 212 where a slip rate Sp is set to zero and proceeds further to Step 214. If the estimated vehicle speed Vs is greater than the minimum speed, the program proceeds to Step 213 where the slip rate Sp is calculated from the estimated vehicle speed Vs and the wheel speed Vw, and proceeds further to Step 214.

At Step 214, a wheel speed deviation ΔVw is calculated as a difference between the estimated vehicle speed Vs and the wheel speed Vw. The program then proceeds to Step 215 where it determines if the wheel speed deviation ΔVw is equal to or less than zero. If the result is affirmative, the program proceeds to Step 216 where an integrated value SΔVw of the wheel speed deviation ΔVw is set to zero and proceeds further to Step 218. If the wheel speed deviation ΔVw is greater than zero, the program proceeds to Step 217 where the integrated value SΔW is set to the integrated value SΔW adding thereto the wheel speed deviation ΔVw.

Thereafter, the program proceeds to Step 218 where it determines if the motor 20 is in an off condition, or determines whether or not the anti-skid control has been initiated. If the motor 20 is in an on condition, i.e., the anti-skid control operation is being performed, the program proceeds to Step 222. If the motor 20 is in the off condition like in the initial condition, the program proceeds to Steps 219 and 220. Firstly, at Step 219, it is determined if the estimated vehicle speed Vs is greater than a predetermined speed of 10 km/h. If it is not greater than 10 km/h, the program proceeds to Step 228 in FIG. 5. If the estimated vehicle speed Vs exceeds 10 km/h, the program proceeds to Step 220 where it determines if the wheel speed Vw is less than the value of (K3·Vs−K4). If an affirmative decision is made, the program proceeds to Step 221 where the motor 20 is operated, whereas if a negative decision is made, the program proceeds to Step 228. The value of (K3·Vs−K4) used at Step 220 provides a threshold level for determining the initiation of anti-skid control, wherein K3 and K4 are certain values, and in the present embodiment, K3 is set to 0.95 and K4 is set to 2.0 km/h for example. The values K3, K4 may be set to various values depending on the various vehicle characteristics.

Figure 8:
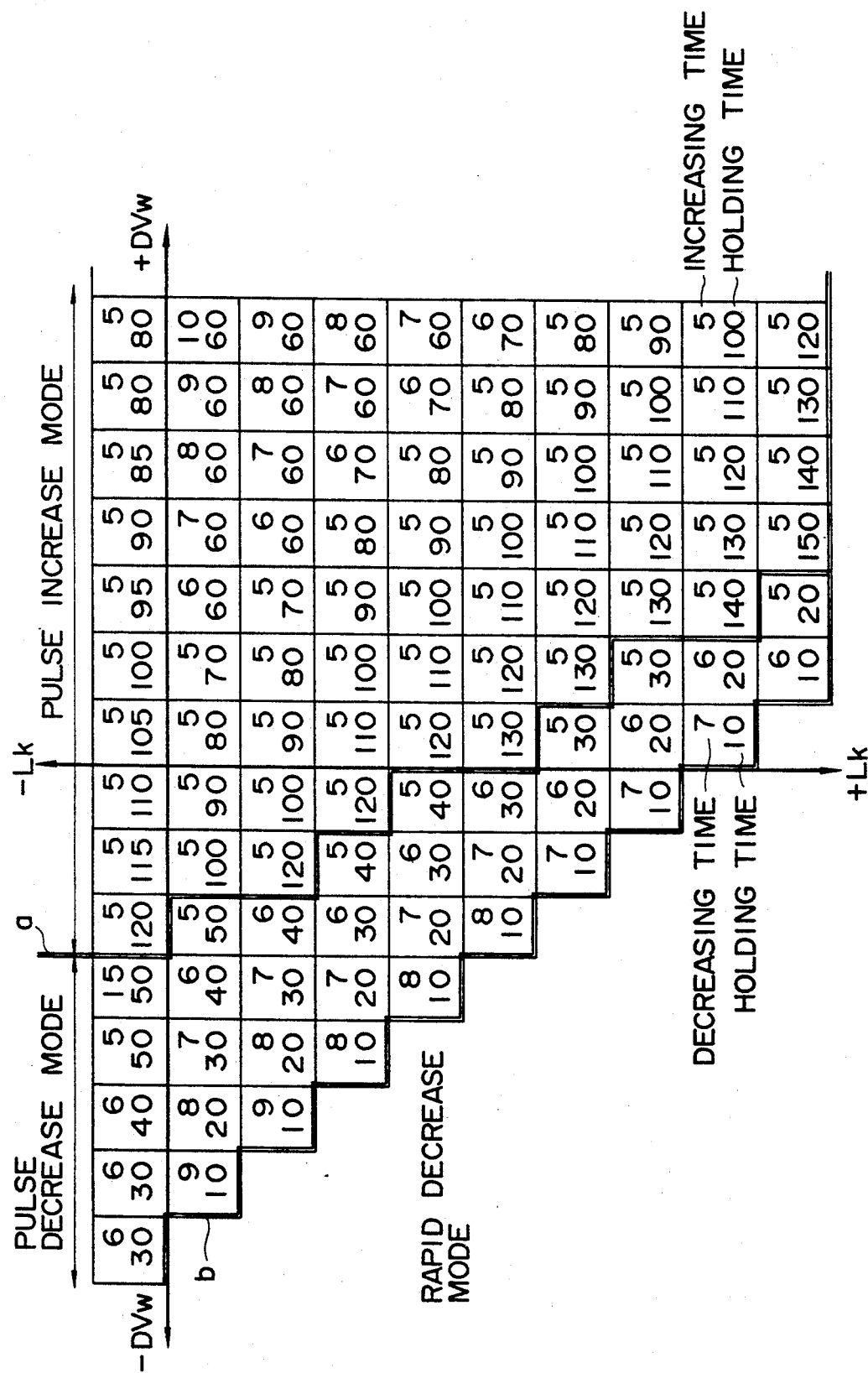
FIG. 8 is a diagram showing an increasing time and a holding time provided in a section, and a decreasing time and a holding time provided in a section in response to a wheel acceleration and a wheel lock rate according to the above embodiment.

Then, the program proceeds to Step 222 where a wheel lock rate Lk for indicating a locking condition of the road wheel is calculated in accordance with the following equation (1):

$$Lk = \frac{C \cdot Sp + D \cdot \Delta Vw}{C + D} + Kx \cdot S\Delta Vw \tag{1}$$

where C and D are certain values for giving weight to the slip rate Sp and the wheel speed deviation $\Delta Vw$. In general, the more the slip rate Sp is given weight, the more likely the wheel cylinder pressure is excessively decreased in the low speed area, while the more the wheel speed deviation $\Delta Vw$ is given weight, the more likely the wheel cylinder pressure is excessively decreased in the high speed area. Kx is a certain value for giving weight to the integrated value $S\Delta Vw$ in connection with the values C and D. In general, the more the integrated value $S\Delta Vw$ is given weight, the more likely the wheel cylinder pressure is excessively decreased. At the next Step 223, the decreasing time and holding time of the wheel cylinder pressure are set to those times defined in the pulse decrease mode respectively in response to the values of the wheel lock rate Lk and wheel acceleration DVw, or the increasing time and holding time of the wheel cylinder pressure are set to those times defined in the pulse increase mode respectively in response to those values Lk and DVw, in accordance with a map or table as shown in FIG. 8. If the rapid decrease mode is selected in the table of FIG. 8, the rapid decrease flag is set (to "1").

In FIG. 8, the abscissa represents the wheel acceleration DVw, and the ordinate represents the wheel lock rate Lk which indicates a positive value in the downward direction from a point crossed by the abscissa and a negative value in the upward direction therefrom. The wheel acceleration DVw indicates zero G (G is the acceleration of gravity) at a point crossed by the ordinate, and indicates a positive value in the rightward direction therefrom and a negative value (i.e., deceleration) in the leftward direction therefrom. In accordance with the values of the wheel acceleration DVw and the wheel lock rate Lk, there is formed the table as shown in FIG. 8, which is stored in the memory of the microcomputer 11 and in which a central zone surrounded by double lines a and b is provided for the pulse decrease mode. A right zone defined on the right side of the double line a is provided for the pulse increase mode, while a left zone defined on the left side of the double line b is provided for the rapid decrease mode so that the holding time has been set to zero in the left zone. In the pulse increase mode, the increasing time (milliseconds) is provided at the upper row in each section of the table, while the holding time (milliseconds) is provided at the lower row in each section. In the pulse decrease mode, the decreasing time (ms) is provided at the upper row in each section of the table, while the holding time (ms) is provided at the lower row in each section.

The pulse decrease mode is a pressure control mode which alternately decreases and holds the wheel cylinder pressure repeatedly, so that the wheel cylinder pressure is reduced with the solenoid valves 31 to 38 operated in response to the decreasing time and the holding time set as described above. Accordingly, the decreasing speed of the wheel cylinder pressure is controlled in accordance with the proportion of the decreasing time and holding time. Similarly, in the pulse increase mode, the solenoid valves 31 to 38 are operated in response to the increasing time at the upper row in each section and the holding time at the lower row. The decreasing time, increasing time and holding time are counted by the aforementioned decrease timer, increase timer and hold timer respectively. Regarding to the proportion of the decreasing time and holding time in the pulse decrease mode, since the wheel acceleration DVw corresponds to the sufficient or insufficient amount of the wheel cylinder pressure, the proportion of the decreasing time and increasing time is provided such that the more the wheel acceleration is reduced, i.e., the wheel deceleration is increased, the more the wheel cylinder pressure is decreased, namely the decreasing time becomes longer while the holding time becomes shorter. In the case where the wheel lock rate Lk is large, it is determined that the vehicle is traveling on the road of rather low coefficient of friction, so that the proportion of the decreasing time and holding time is provided for decreasing the wheel cylinder pressure largely, since in case of rather low wheel cylinder pressure, the decreasing speed of the wheel cylinder pressure therefrom is low.

As to the pulse increase mode, however, in the case where the wheel acceleration DVw is large, the proportion of the increasing time and holding time is provided for increasing the wheel cylinder pressure largely even when the wheel lock rate Lk is large, so that the braking distance is prevented from being extended due to insufficiency of the wheel cylinder pressure. Further, in the case where the road wheel is likely to be locked after the wheel lock rate Lk has become small, the proportion of the increasing time and holding time is provided for increasing the wheel cylinder pressure gradually, so that the rapid decrease of the wheel speed Vw is prevented. Thus, a fine control of the wheel cylinder pressure can be performed in accordance with various characteristics in braking operation such as the response of the solenoid valves 31 to 38, the decreasing speed of the wheel cylinder pressure, the increasing speed thereof or the like, by properly providing the proportion of the decreasing time and holding time in the pulse decrease mode, and that of the increasing time and holding time in the pulse increase mode.

Figure 4:
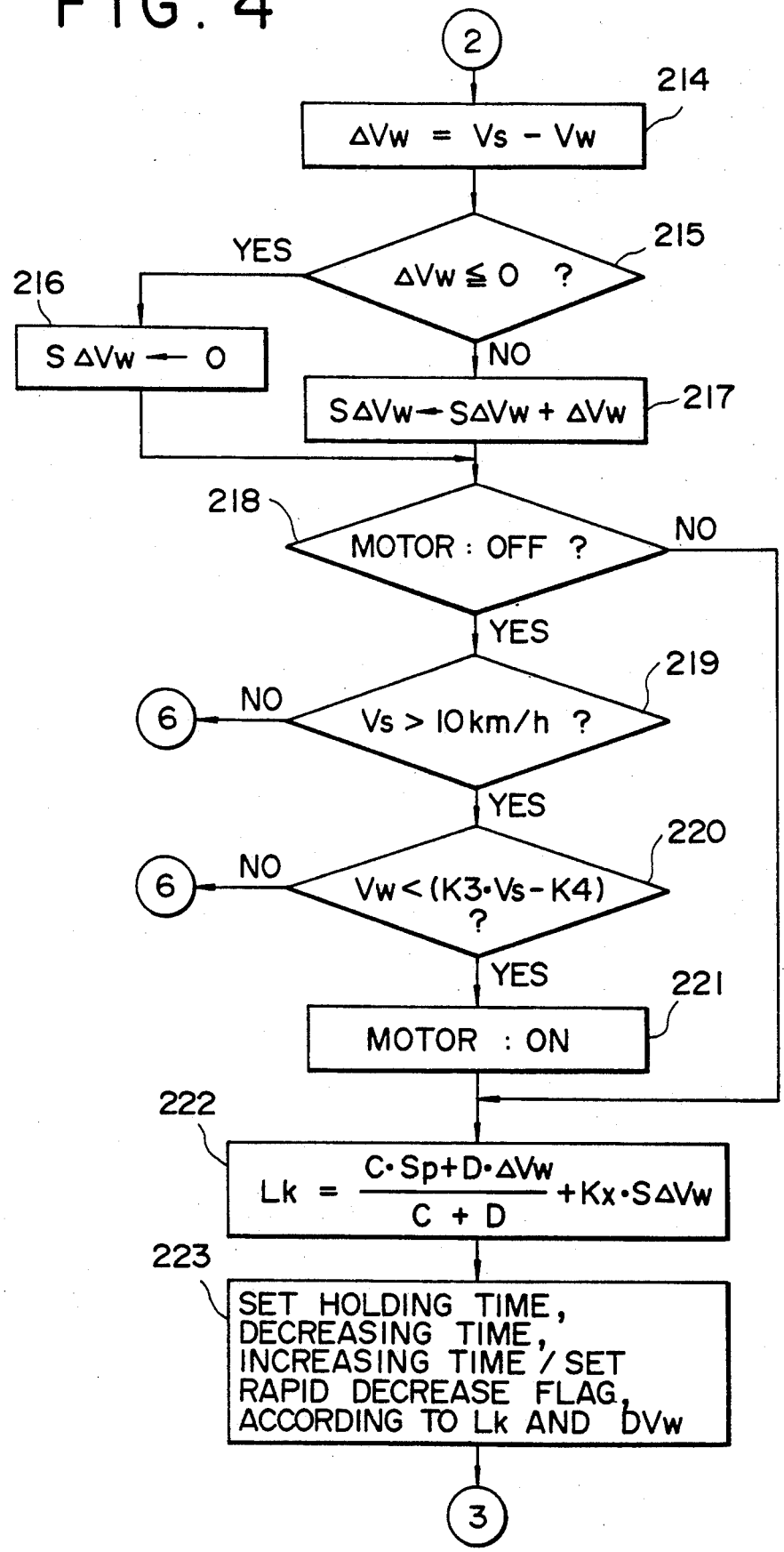
Figure 5:
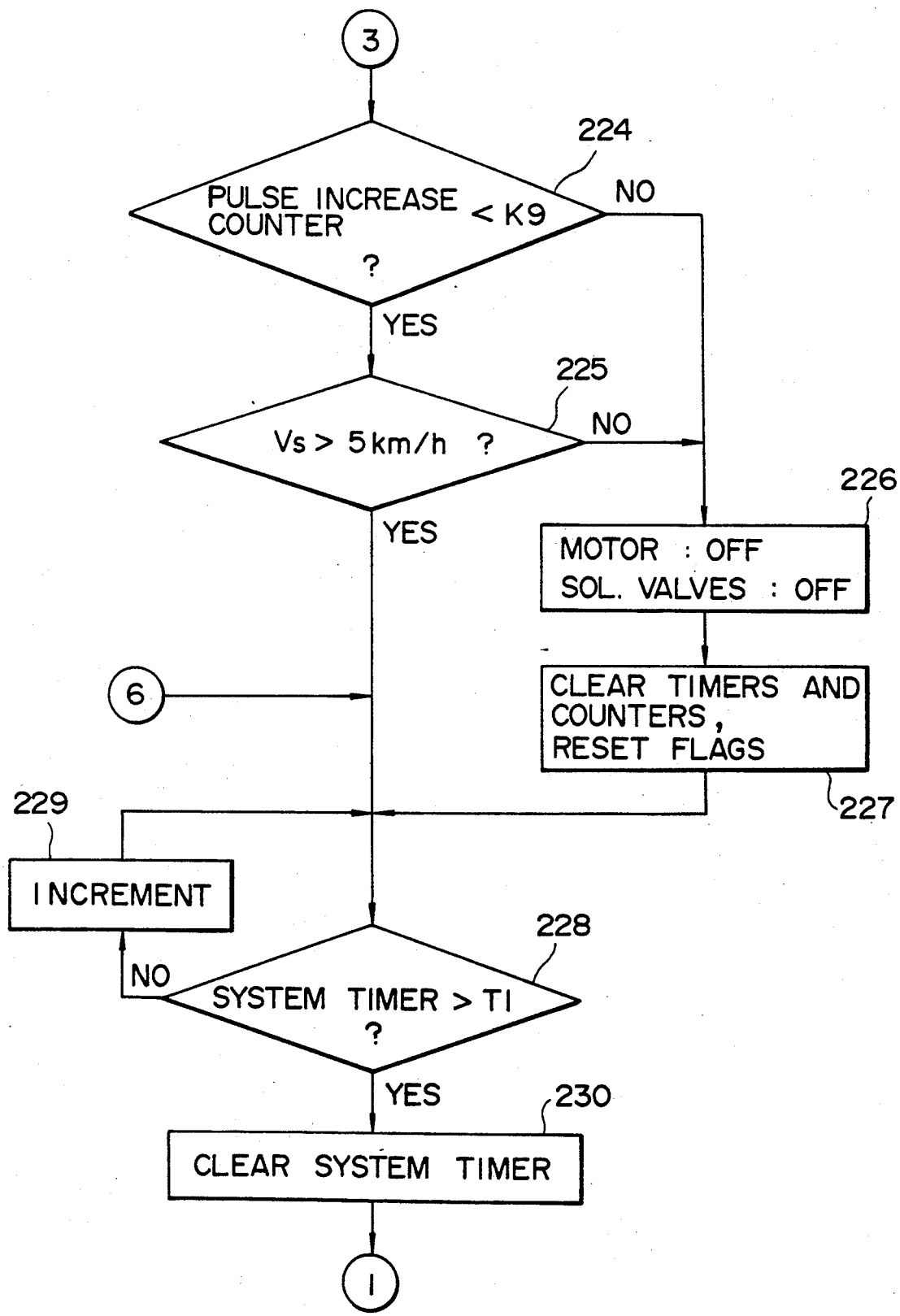

From Step 223 in FIG. 4, the program proceeds to Steps 224 and 225 in FIG. 5 where it determines if the anti-skid control is to be finished. Namely, if the pulse increase counter counts a predetermined number K9 or more, or if the estimated vehicle speed Vs is 5 km/h or less when the counter counts less than the number K9, the program proceeds to Step 226 where the motor 20 is turned off and the solenoid valves 31 to 38 are turned off. Then, the program proceeds to Step 227 where the hold timer, decrease timer, increase timer and pulse increase counter are cleared, and where the pulse increase flag and rapid decrease flag are reset. Thereafter, at Steps 228 to 230, the operation period of 3 to 5 milliseconds in general is set. That is, if the system timer does not exceed a predetermined time T1, it is incremented at Step 229, and if the predetermined time T1 elapses, the system timer is cleared at Step 230 and the program returns to Step 202 in FIG. 3. If the pulse increase counter counts less than the number K9 and the estimated vehicle speed Vs is greater than 5 km/h, the program proceeds to Step 225.

Figure 6:
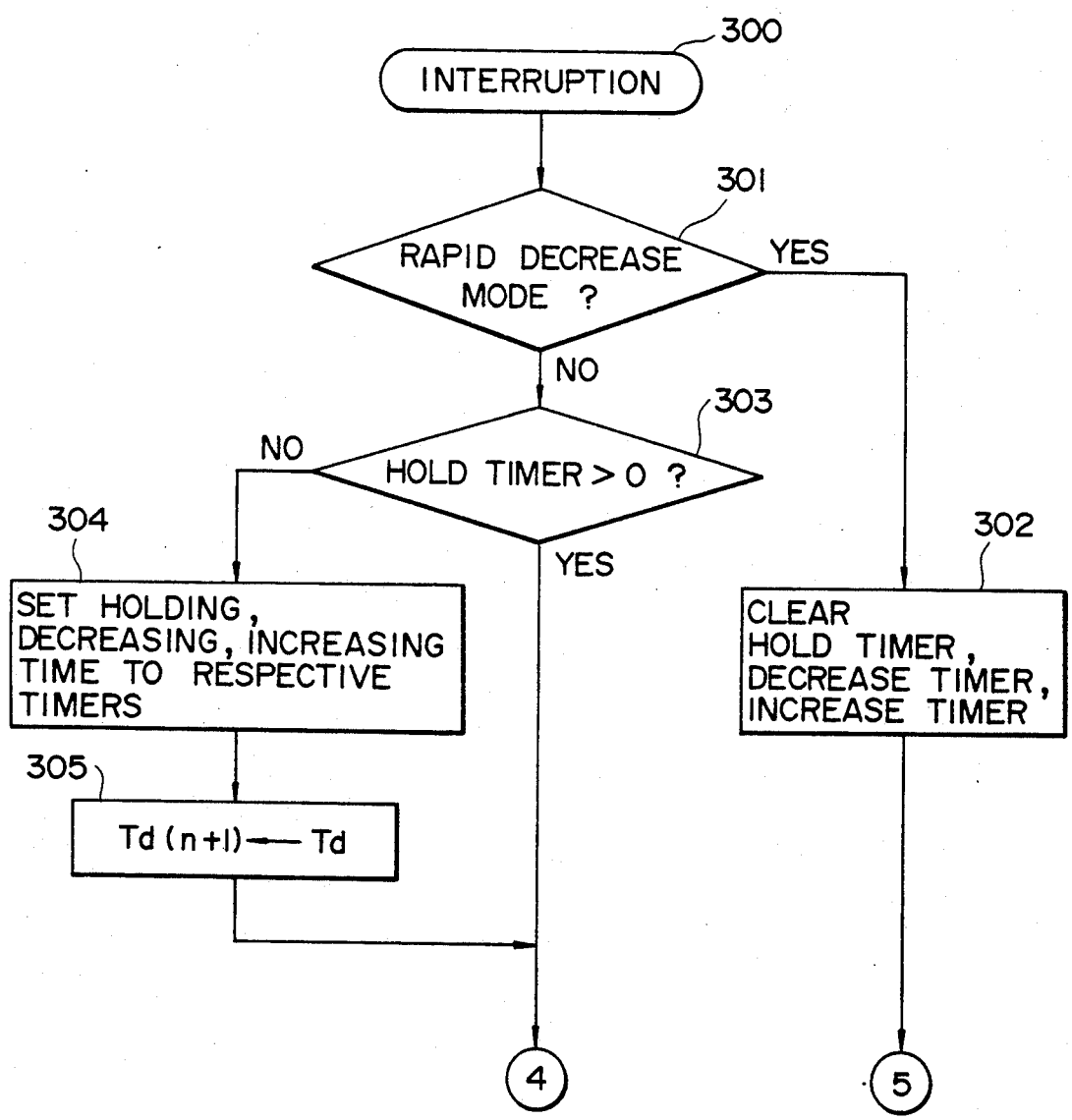
Figure 7:
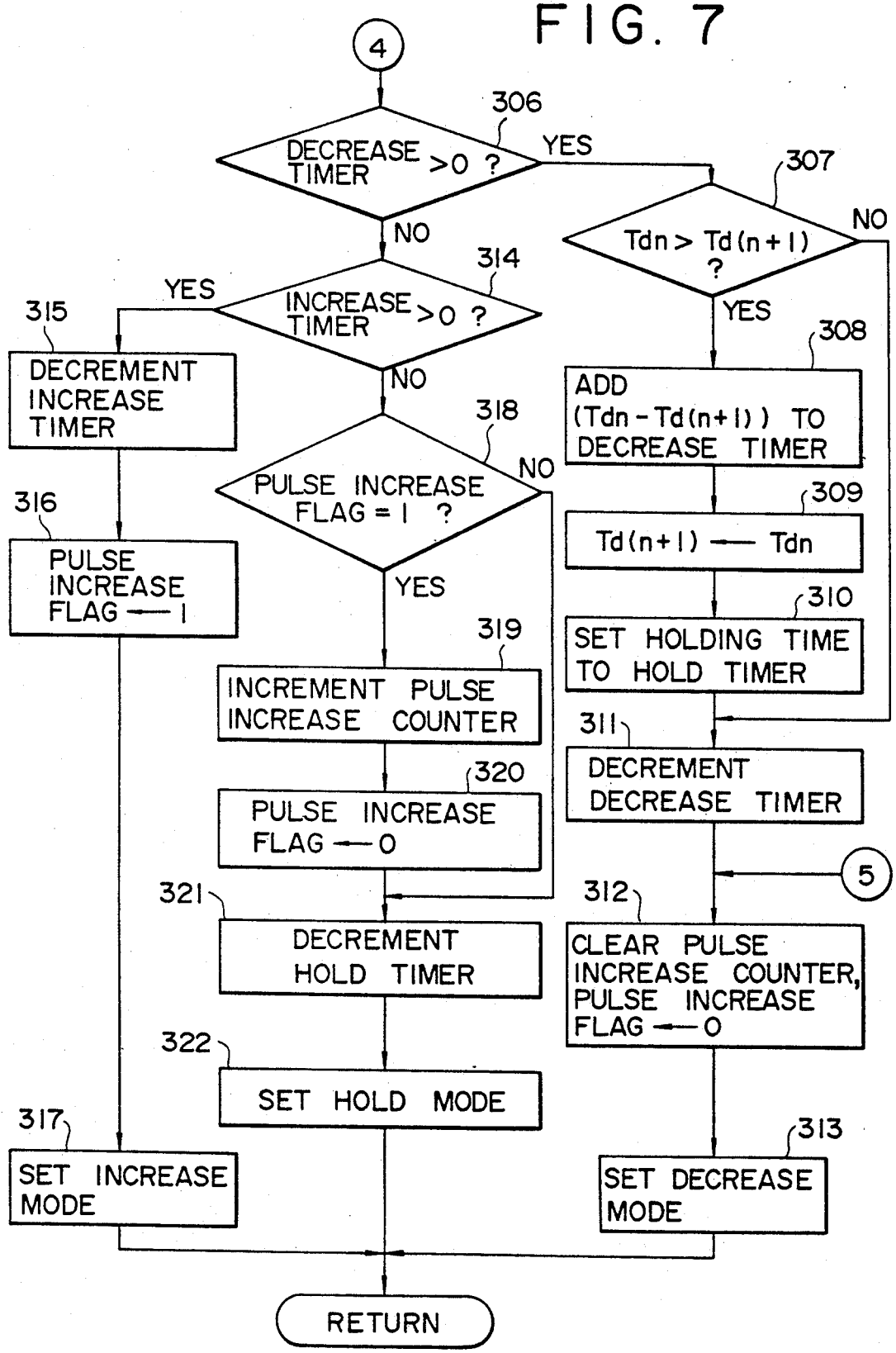

FIGS. 6 and 7 show a routine for interruption which interrupts the above-described routine every one millisecond to feed driving signals to solenoid valves 31 to 38. Firstly, at Step 301, the program determines if the rapid decrease mode is set, i.e., if the rapid decrease flag was set at Step 223. In case of the rapid decrease mode, the hold timer, decrease timer and increase timer are cleared to zero respectively at Step 302, and the program proceeds to Step 312. If the rapid decrease mode is not set, the program proceeds to Step 303 where it determines if the hold timer is set, i.e., if it exceeds zero. If the hold timer is zero, the program proceeds to Step 304 where the holding time, decreasing time and increasing time defined at Step 223 are set to the hold timer, decrease timer and increase timer respectively. Thereafter, at Step 305, the decreasing time Td at present cycle is set to the decreasing time Td(n+1) for the next cycle.

Next, the program proceeds to Step 306 as shown in FIG. 7 where it determines if the decrease timer is set. If it is set, the program proceeds to Step 307 to 313 where the decrease mode is set. At Steps 307 and 308, when the decreasing time has been extended due to out of control from the table of FIG. 8 during the decrease mode signal outputs in the pulse decrease mode, the decreasing time is reset to a new decreasing time. Namely, if the present decreasing time Tdn comes to be longer than the next decreasing time Td(n+1) set at Step 305, the difference therebetween (Tdn−Td(n+1)) is added to the present time of the decrease timer, then the next decreasing time Td(n+1) is reset to the present decreasing time Tdn at Step 309, and the program proceeds to Step 310 where the hold timer is set to the holding time at that time according to the table of FIG. 8. Thereafter, the decrease timer is decremented by one (−1) at Step 311, then the pulse increase counter is cleared, and the pulse increase flag is reset to zero respectively at Step 312. Accordingly, the decrease mode signal outputs at Step 313, so that the solenoid valves 31, 33, 35, 37 located on the hydraulic pressure supplying side are turned on to block the supply of hydraulic pressure, and the solenoid valves 32, 34, 36, 38 located on the drain side are turned on to drain the hydraulic pressure to the reservoirs 23, 24.

Returning to Step 306, if the decrease timer is not set, the program proceeds to Step 314 where it determines if the increase timer is set. If the increase timer is set, the program proceeds to Step 315 where the increase timer is decremented by one (−1), and further proceeds to Step 316 where the pulse increase flag is set (to "1"). Then, at Step 317, the increase mode is set, so that all the solenoid valves 31 to 38 are turned off to be in the condition as shown in FIG. 1, i.e., their hydraulic pressure supplying sides are open and their drain sides are closed.

In the case where it is determined at Step 314 that the increase timer is not set so that it indicates zero, the program proceeds to Step 318 where it determines if the pulse increase flag is set. If yes, the program proceeds to Step 319 where the pulse increase counter is incremented by one (+1), and further proceeds to Step 320 where the pulse increase flag is reset to zero. Then, the hold timer is decremented by one (−1) at Step 321, and the hold mode is set at Step 322. If it is determined at Step 318 that the pulse increase flag is not set, the program proceeds to Step 322 without executing Steps 319, 320. At Step 322, the solenoid valves 31, 33, 35, 37 are turned on and the solenoid valves 32, 34, 36, 38 are turned off, so that the wheel cylinder pressure in each of the wheel brake cylinders 51 to 54 is held as it is.

According to the present embodiment, therefore, the decreasing time, increasing time and holding time are adequately set in accordance with the relationship between the wheel acceleration DVw and the wheel lock rate Lk, so that most appropriate proportion of those times may be set in view of the increasing or decreasing characteristic of the wheel cylinder pressure controlled by the pressure control means such as the solenoid valves 31 to 38. For example, when both the wheel acceleration DVw and the wheel lock rate Lk are close to zero, the proportion of the decreasing time and holding time may be set to provide the decrease mode in which the amount of decreasing pressure is reduced. If the decreasing time is controlled to be increased gradually in response to increase of the wheel lock rate Lk and the wheel deceleration, i.e., the decrease of the wheel acceleration DVw, any influence affected by dispersion of responses of the pressure control means such as the solenoid valves 31 to 38 will be made small. In the case where the wheel acceleration DVw is relatively small, i.e., the wheel speed Vw starts increasing, the increasing time will be reduced to prevent the road wheel from being locked.

Further, since the wheel lock rate Lk is obtained by adding the slip rate Sp with a certain value given weight to the wheel speed deviation ΔVw with another certain value given weight, and further adding the result to the integrated value SΔVw of the wheel speed deviation ΔVw, the decreasing amount of the wheel cylinder pressure can be increased in response to the period during the wheel speed Vw is slightly smaller than the estimated vehicle speed Vs and the deviation therebetween to recover the wheel speed adequately, irrespective of the value of wheel acceleration DVw. For example, even when the wheel acceleration DVw is less than the threshold level for decreasing the wheel cylinder pressure so that the wheel speed Vw is gradually decreased, the wheel cylinder pressure is adequately decreased in accordance with the above condition estimated by the integrated value SΔVw to improve the controllability and stability of vehicle.

FIGS. 9 to 12 show a part of flowchart of a routine executed in another embodiment of the present invention. Since Steps 201 to 217 are the same as those of the aforementioned embodiment as shown in FIG. 3, the explanation thereof will be omitted. In this embodiment, the proportion of the increasing time and holding time, and that of the decreasing time and the holding time are set in accordance with equations. Further, in this embodiment, a hold flag is provided for setting (to "1") when the hold mode is set.

Figure 9:
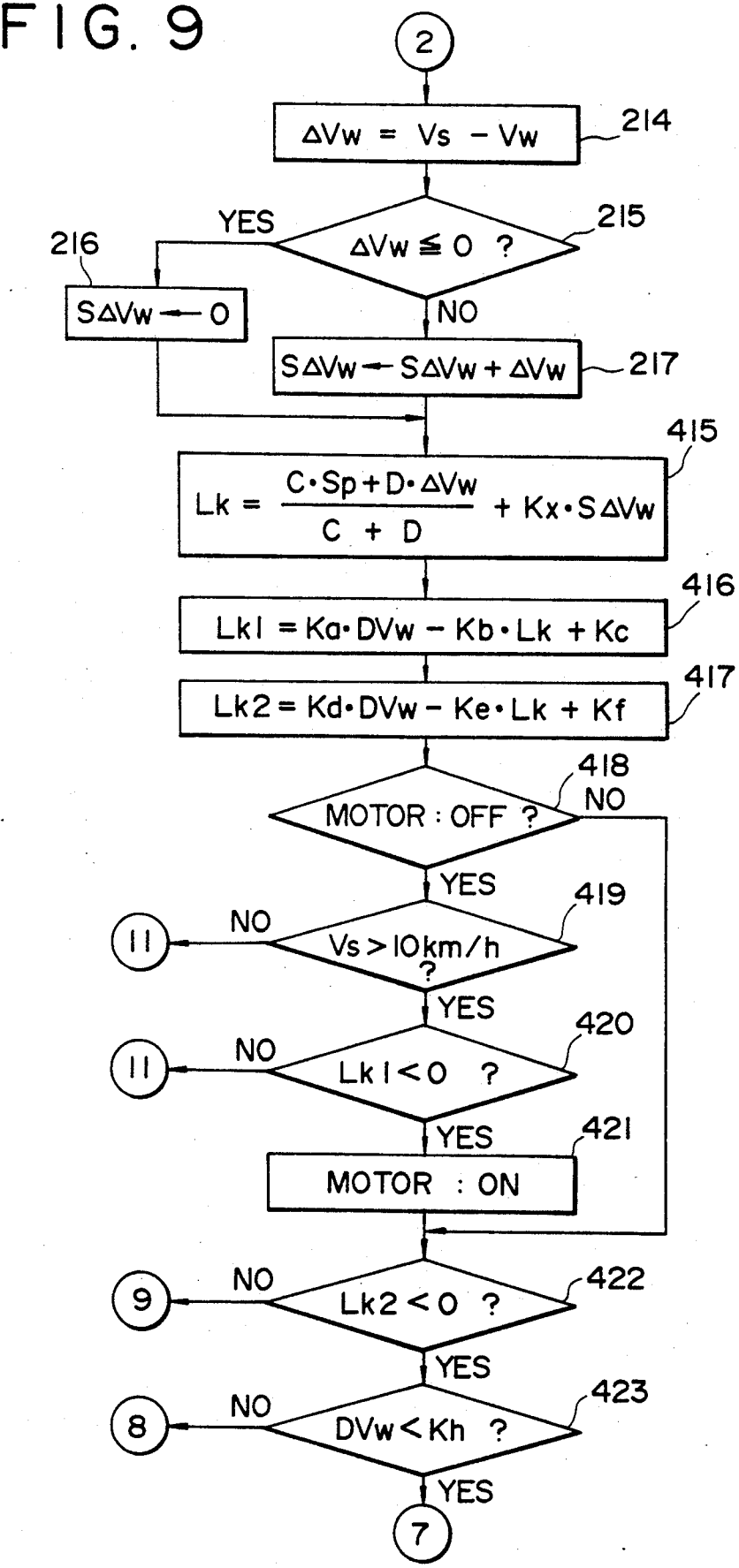
FIGS. 9, 10, 11, 12 and 13 are flowcharts showing the operation of the braking force control according to another embodiment of the present invention.
Figure 14:
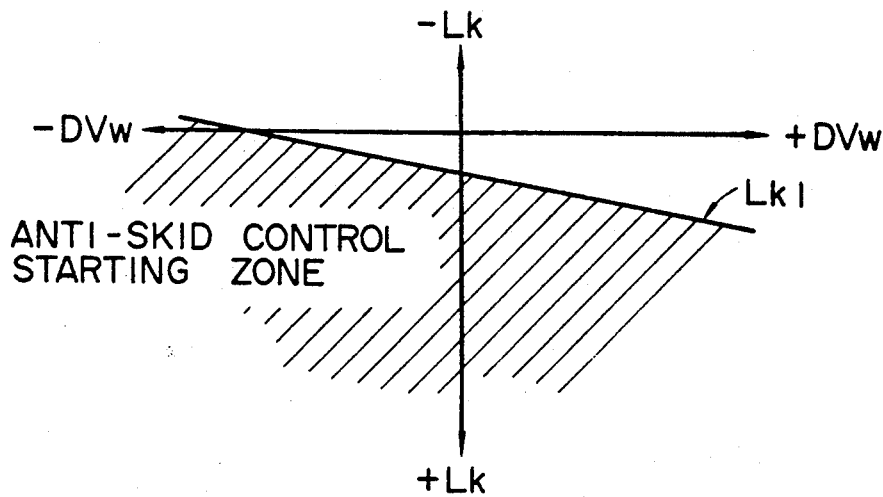
FIG. 14 is a diagram showing the condition for starting the anti-skid control in another embodiment of the present invention.
Figure 15:
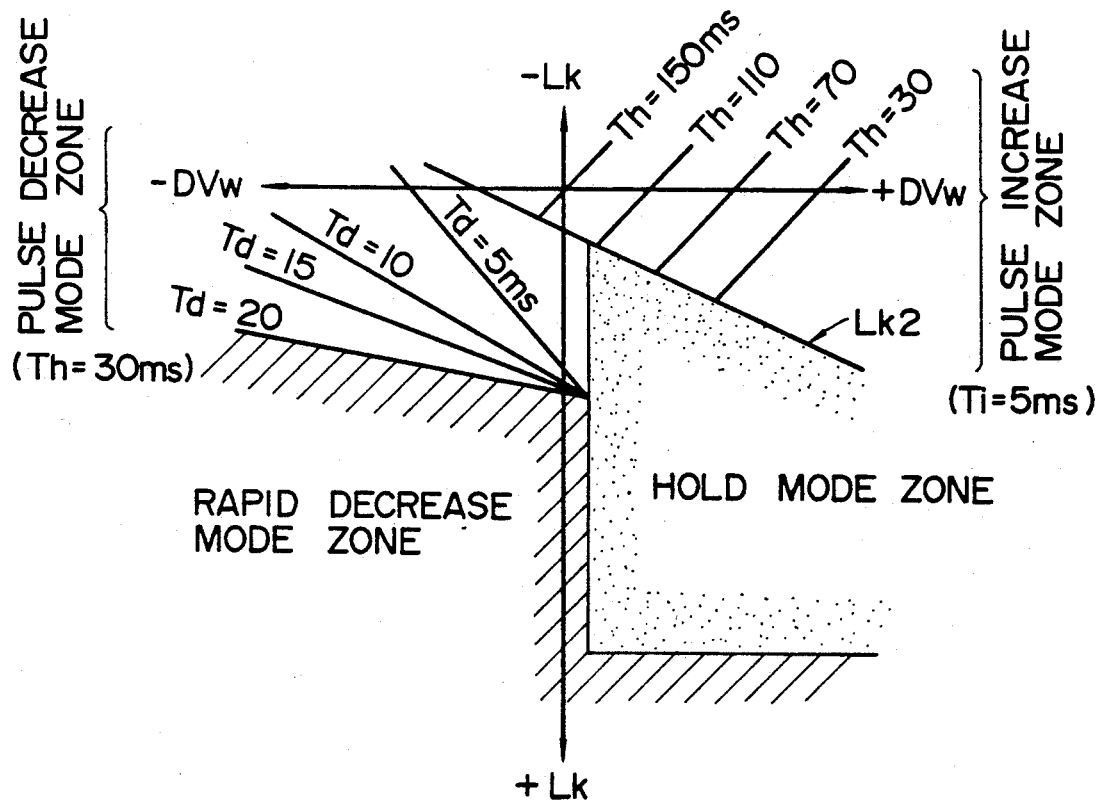
FIG. 15 is a diagram showing control mode zones provided in response to the wheel acceleration and the wheel lock rate according to another embodiment of the present invention.

Referring to FIG. 9, after Step 217 is executed, Step 415 is executed in the same manner as the aforementioned Step 222. Namely, the wheel lock rate Lk for indicating a locking condition of the road wheel is calculated. Then, the program proceeds to Step 416 where a first desired value Lk1 is set in accordance with the following equation (2), and further proceeds to Step 417 where a second desired value Lk2 is set in accordance with the following equation (3):

$$Lk1 = Ka \cdot DVw - Kb \cdot Lk + Kc \quad (2)$$

$$Lk2 = Kd \cdot DVw - Ke \cdot Lk + Kf \quad (3)$$

where Ka and the like are certain values which are set in the present embodiment, for example Ka=1, Kb TM 1, Kc=5, Kd=2.5, Ke=1 and Kf=3. The first desired value Lk1 provides a threshold level for determining an anti-skid control starting zone as shown in FIG. 14, while the second desired value Lk2 provides a threshold level for determining a pulse increase mode zone as shown in FIG. 15.

Thereafter, the program proceeds to Step 418 where it determines if the motor 20 is in an off condition, i.e., it determines if the anti-skid control operation is being performed. If the motor 20 is in the on condition, i.e., under anti-skid control, the program proceeds to Step 422, whereas, if the motor 20 is in the off condition like in its initial condition, the program proceeds to Steps 419 and 420 where it determines the conditions for initiating the anti-skid control operation. At Step 419, the estimated vehicle speed vs is compared with a predetermined speed of 10 km/h. If it is not greater than 10 km/h, the program proceeds to Step 443. If it exceeds 10 km/h, then the program proceeds to Step 420 where it determines if the first desired value Lk1 is less than zero. If the value Lk1 is not less than zero, the program proceeds to Step 443. If it is less than zero, the program proceeds to Step 421 where the motor 20 is turned on. Namely, the anti-skid control operation is performed, provided that a position determined in accordance with the values of the wheel acceleration DVw and wheel lock rate Lk falls within the zone of oblique lines as shown in FIG. 14. At Step 422, the program determines if the second desired value Lk2 is less than zero. If not, the program proceeds to Step 433 in FIG. 11, so that the pulse increase mode is set at Steps following Step 433. If the second desired value Lk2 is less than zero, the wheel acceleration DVw is compared with a certain value Kh, which is set to 0.3 G (G is the acceleration of gravity), for example. If the wheel acceleration DVw is not less than the certain value Kh, then the program proceeds to Step 431 where it determines whether the hold mode or the rapid decrease mode is set. If the wheel acceleration DVw is less than the value Kh, the program proceeds to Step 424 where it determines whether the pulse increase mode or the rapid decrease mode is set.

Figure 10:
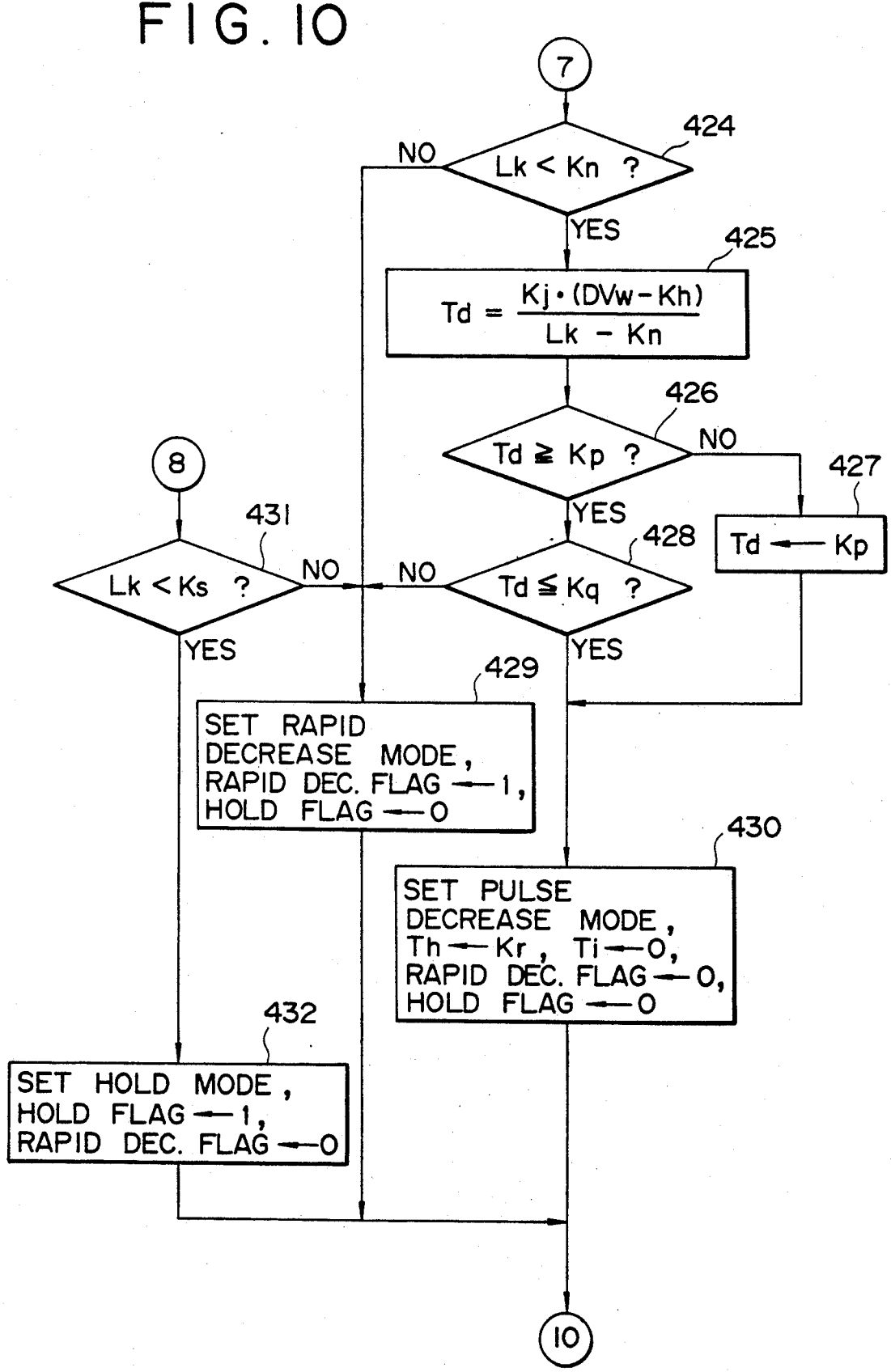
Figure 11:
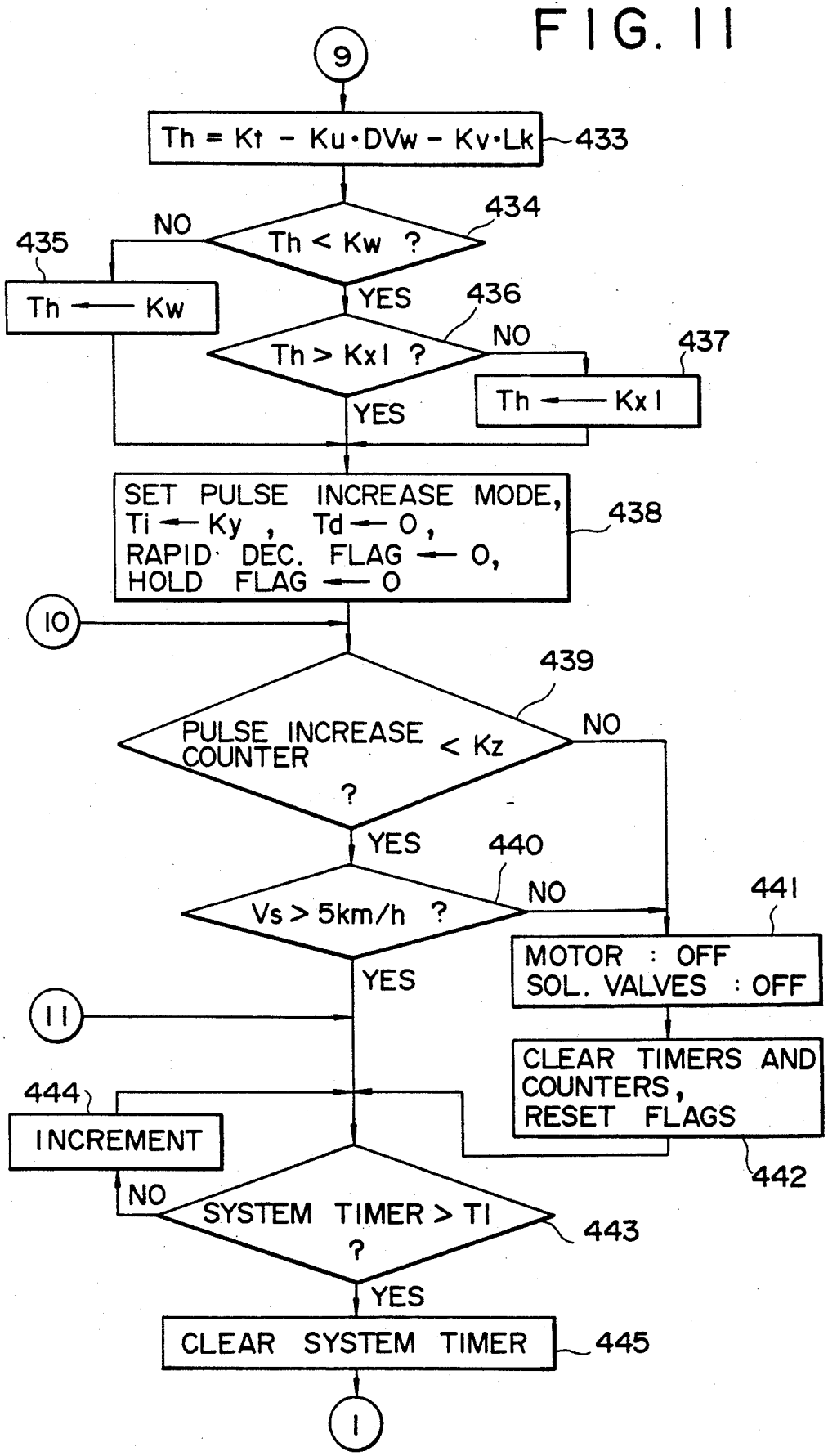

At Step 424 in FIG. 10, the wheel lock rate Lk is compared with a certain value Kn which is set to 25, for example. If the wheel acceleration DVw is equal to or greater than the value Kn, it falls within the rapid decrease mode zone of oblique lines in FIG. 5, then the program proceeds to Step 429 where the rapid decrease mode is set. If the wheel acceleration DVw is less than the value Kn, it falls within the pulse decrease mode zone in FIG. 15, so that the program proceeds to Step 425 where the decreasing time Td for the pulse decrease mode is calculated in accordance with the following equation (4) and proceeds further to Step 426.

$$Td = \frac{Kj \cdot (DVw - Kh)}{Lk - Kn} \quad (4)$$

where Kj is a certain value which is set to 30, for example.

If it is determined at Step 426 that the decreasing time Td is less than a certain value Kp as a lower limit, the decreasing time Td is set to the value Kp at Step 427 which is followed by Step 430. If the decreasing time Td is equal to or more than the value Kp, it is compared with a certain value Kq at Step 428. In the present embodiment, the value Kp is set to 5 milliseconds, while the value Kq is set to 20 milliseconds. If the decreasing time Td is greater than the value Kq, it falls within the rapid decrease mode zone in FIG. 15, so that the program proceeds to Step 429 where the rapid decrease mode is set, the rapid decrease flag is set (to "1") and the hold flag is reset to zero ("0").

If it is determined at Step 428 that the decreasing time Td is equal to or less than the value Kq, it falls within the pulse decrease mode zone in FIG. 15, so that the program proceeds to Step 430 where the pulse decrease mode is set. At the same time, the holding time Th is set to a certain value Kr, the increasing time Ti is set to zero, and the rapid decrease flag and hold flag are reset to zero. The certain value Kr is set to 30 milliseconds, in this embodiment. Accordingly, in the pulse decrease mode zone in FIG. 15, the holding time Th is constant (Kr=30 ms), whereas the decreasing time Td is set in accordance with the above equation (4) to a value between the values Kp (5 ms) and Kq (20 ms) in response to the values of the wheel acceleration DVw and wheel lock rate Lk.

From Step 423 in FIG. 9, the program proceeds to Step 431 in FIG. 10 where the wheel lock rate Lk is compared with a certain value Ks, which is set to 60, for example. If the wheel lock rate Lk is not less than the value Ks, it falls within the rapid decrease mode zone in FIG. 15, then the program proceeds to Step 429 where the rapid decrease mode is set, i.e., the rapid decrease flag is set (to "1") and the hold flag is reset to zero. If the wheel lock rate Lk is less than the value Ks, the program proceeds to Step 432 where the rapid decrease flag is reset to zero and the hold flag is set (to "1"), so that the hold mode is set.

Returning to Step 422, if it is determined that the second desired value Lk2 is equal to or greater than zero, it falls within the pulse increase mode zone as shown in FIG. 15, then the program proceeds to Step 433 where the holding time Th is calculated in accordance with the following equation (5):

$$Th = Kt - Ku \cdot DVw - Kv \cdot Lk \quad (5)$$

where Kt, Ku and Kv are certain values, and Kt is set to 150, Ku is set to 20 and Kv is set to 2 in this embodiment. At Step 434, the holding time Th is compared with a certain value Kw which is an upper limit. If the holding time Th is not less than the value Kw, the program proceeds to Step 435 where the holding time Th is set to the value Kw, and further proceeds to Step 438. If the holding time Th is less than the value Kw, the program proceeds to Step 436 where it is compared with a certain value K×1 which is a lower limit. If the holding time Th is greater than the value K×1, the program proceeds to Step 438. If the holding time Th is not greater than the value K×1, the program proceeds to Step 437 where the holding time Th is set to the value K×1, and further proceeds to Step 438. Then, at Step 438, the pulse increase mode is set, the increasing time Ti is set to a certain value Ky, and the decreasing time Td is set to zero. At the same time, the rapid decrease flag and hold flag are reset to zero. The values Kw, K×1 and Ky are set to 150 ms, 20 ms and 5 ms, respectively. Accordingly, in the pulse increase mode zone as shown in FIG. 15, the increasing time Ti is constant (Ky=5 ms), whereas the holding time Th is set in accordance with the above equation (5) to a value between the values Kw (150 ms) and K×1 (20 ms) in response to the values of the wheel acceleration DVw and wheel lock rate Lk.

Thereafter, the program proceeds to Step 439 where the number of outputs of the pulse increase mode, which is counted by the pulse increase counter, is compared with a certain value Kz. If it is less than the value Kz, the program proceeds to Step 440 where it determines if the estimated vehicle speed Vs is greater than 5 km/h. If yes, the program proceeds to Step 443. In the case where the number of outputs of the pulse increase mode is not less than the value Kz, or the estimated vehicle speed Vs is less than 5 km/h, the motor 20 and solenoid valves 31 to 38 are turned off at Step 441 to finish the anti skid control. Then the decrease timer, hold timer, increase timer, and the pulse increase counter are cleared at Step 442. At the same time, the pulse increase flag, rapid decrease flag and hold flag are reset to zero. Then, at Steps 443 to 445, the operation period of 3 to 5 milliseconds is set. That is, if the system timer counts less than a predetermined time T1, it is incremented at Step 444, and if the time T1 elapses, the system timer is cleared at Step 445 and the program returns to Step 202.

Figure 12:
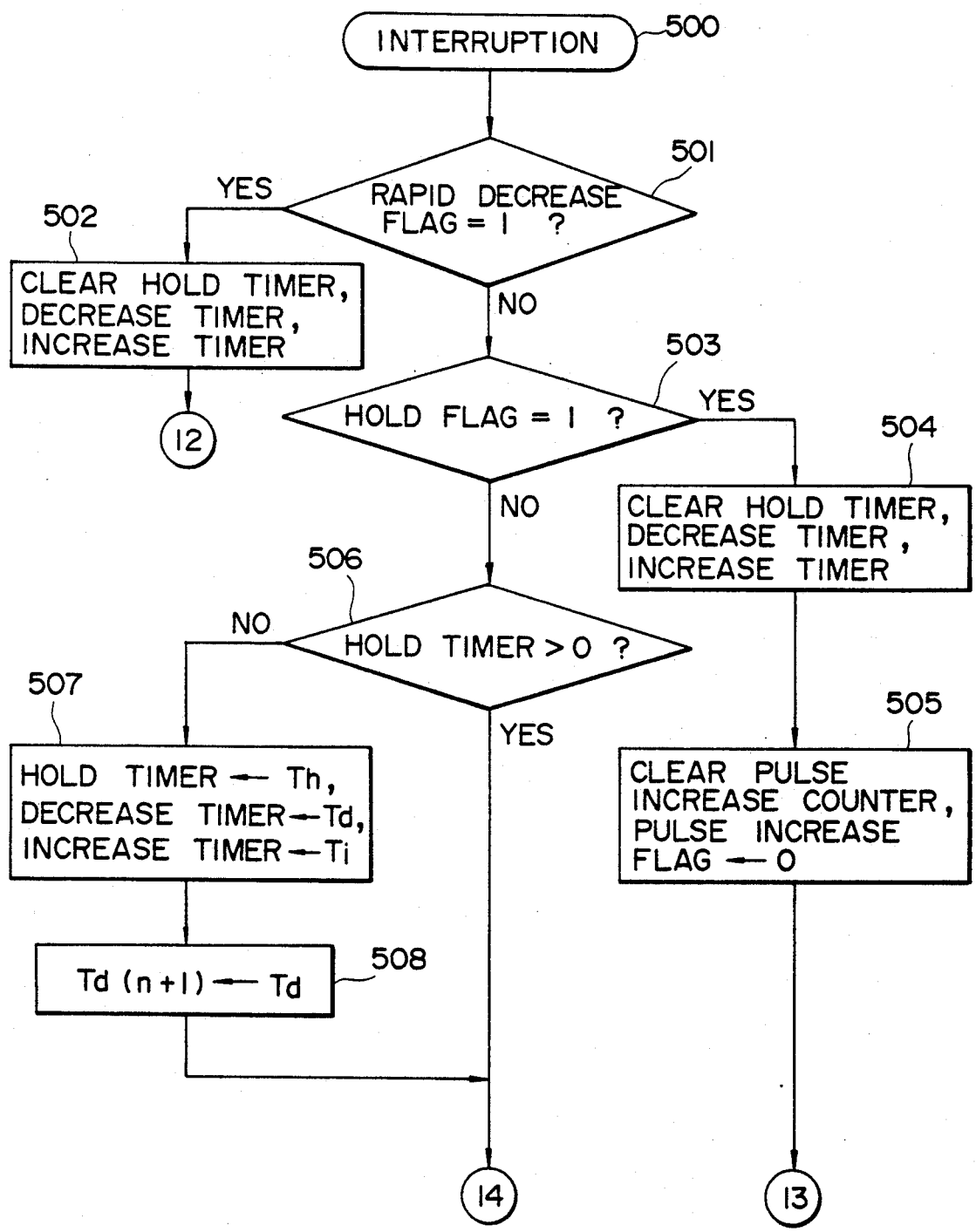
Figure 13:
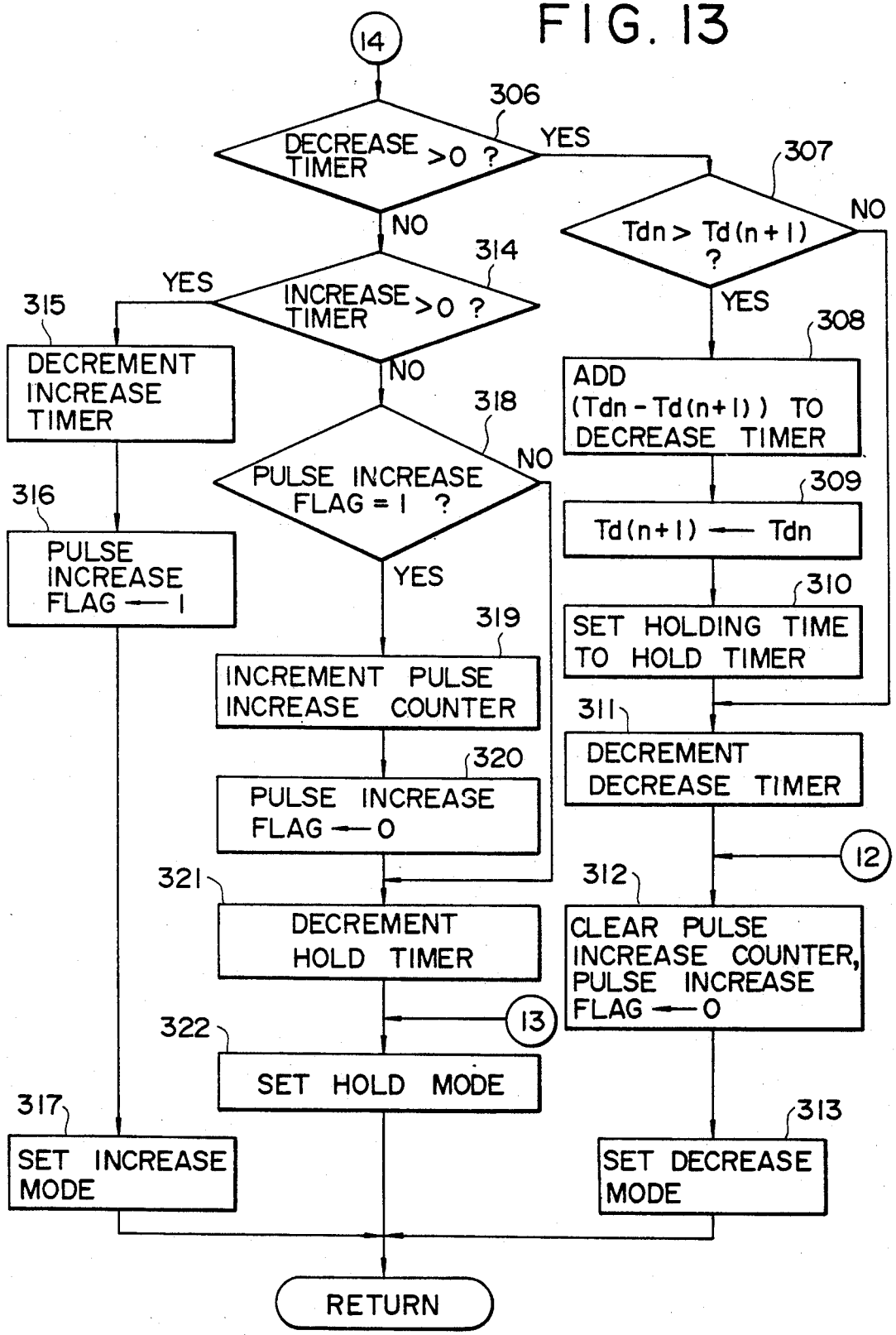

FIGS. 12 and 13 show a routine for interruption which interrupts the above-described routine every one millisecond. Steps 500 to 508 shown in FIG. 12 and Steps 306 to 322 following therefrom as shown in FIG. 13 are substantially the same as those Steps shown in FIG. 7, so that the each Step in FIG. 13 will be designated by the corresponding reference numeral of each Step in FIG. 7 to omit the description thereof.

Firstly, at Step 501 in FIG. 12, it is determined whether the rapid decrease flag is set (to "1") or not. If not, the program proceeds to Step 502 where the hold timer, decrease timer and increase timer are cleared to zero respectively, and proceeds to Step 312 in FIG. 13. If the rapid decrease flag is not set, the program proceeds to Step 503 where it determines if the hold flag is set. If yes, the program proceeds to Step 504 where the hold timer, decrease timer, and increase timer are cleared, then proceeds to Step 505 where the pulse increase counter is cleared, and the pulse increase flag is reset to zero, and further proceeds to Step 322 in FIG. 13 where the hold mode is set. If it is determined at Step 503 that the hold flag is not set, the program proceeds to Step 506 where it determines if the hold timer is set, i.e., determines if it exceeds zero. If the hold timer is set, the program proceeds to Step 507 where the hold timer, decrease timer and increase timer are set respectively to the holding time Th, decreasing time Td and increasing time Ti previously calculated. Then at Step 508, the decreasing time Td in the present cycle is set as the decreasing time Td(n+1) in the next cycle. Thereafter, the program proceeds to Steps following Step 306 in FIG. 13 which will be executed in the same manner as those Steps in FIG. 7. At Steps 308 to 310, however, when the decreasing time gets long due to change in the wheel lock rate Lk or wheel acceleration DVw during the operation in the pulse decrease mode as shown in FIG. 15, the pressure decreasing operation is performed during the prolonged decreasing time.

According to the above embodiment, the decreasing time in the pulse decrease mode and the holding time in the pulse increase mode are calculated in accordance with the relationship between the wheel acceleration DVw and wheel lock rate Lk and set to appropriate values, so that the most appropriate times can be set, taking into consideration the increasing or decreasing characteristic of the wheel cylinder pressure controlled by the pressure control means such as the solenoid valves 31 to 38.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle having a wheel brake cylinder mounted on each road wheel for applying a braking force thereto and a master cylinder for supplying a hydraulic braking pressure to said wheel brake cylinder, comprising:
   means for detecting a wheel speed of said road wheel and providing an output signal corresponding to said wheel speed;
   means for receiving said output signal and calculating a wheel acceleration from said wheel speed;
   means for receiving said output signal and setting an estimated vehicle speed calculated on the basis of said wheel speed;
   means for calculating a difference between said wheel speed and said estimated vehicle speed;
   means for setting a wheel lock rate indicative of a locking condition of said road wheel on the basis of at least an integrated value of said difference between said wheel speed and said estimated vehicle speed obtained during a predetermined period of time;
   means for setting an increasing time for increasing said hydraulic braking pressure applied to said wheel brake cylinder and a holding time for holding said hydraulic braking pressure with a proportion between said increasing time and said holding time being determined in response to a relationship between said wheel acceleration and said wheel lock rate, and for setting a decreasing time for decreasing said hydraulic braking pressure and said holding time with a proportion between said decreasing time and said holding time being determined in response to a relationship between said wheel acceleration and said wheel lock rate; and
   pressure control means for alternately increasing and holding said hydraulic braking pressure in response to said increasing time and said holding time, or alternately decreasing and holding said hydraulic braking pressure in response to said decreasing time and said holding time.

2. An anti-skid control system for an automotive vehicle as set forth in claim 1, further comprising means for calculating a slip rate on the basis of said wheel speed and said estimated vehicle speed, wherein said means for setting said wheel lock rate sets said wheel lock rate on the basis of said integrated value and a value added thereto and is calculated from at least one of said slip rate and said difference between said wheel speed and said estimated vehicle speed.

3. An anti-skid control system for an automotive vehicle as set forth in claim 2, wherein said means for setting said wheel lock rate sets said wheel lock rate by adding said slip rate with a certain weight given thereto to said difference with another certain weight given thereto, and adding the total value thereof to said integrated value.

4. An anti-skid control system for an automotive vehicle as set forth in claim 3, wherein said means for setting said increasing time, decreasing time and holding time includes memory means for storing a table of a plurality of sections divided in accordance with said wheel acceleration and said wheel lock rate, a part of said sections having said increasing time and said holding time defined in each section in response to the values of said wheel acceleration and said wheel lock rate, and another part of said sections having said decreasing time and said holding time defined in each section in response to the values of said wheel acceleration and said wheel lock rate.

5. An anti-skid control system for an automotive vehicle as set forth in claim 4, wherein said pressure control means comprises actuating means disposed in a hydraulic circuit communicating said master cylinder with said wheel brake cylinder for controlling said hydraulic braking pressure supplied to said wheel brake cylinder.

6. An anti-skid control system for an automotive vehicle as set forth in claim 3, wherein said means for setting said increasing time, decreasing time and holding time sets one of said increasing time and said holding time to a certain value and obtains the other as a function of said wheel acceleration and said wheel lock rate, and sets one of said decreasing time and said holding time to a certain value and obtains the other as a function of said wheel acceleration and said wheel lock rate.

* * * * *